(No Model.)
G. C. BOLGIANO.
SASH BALANCE.
No. 325,152. Patented Aug. 25, 1885.
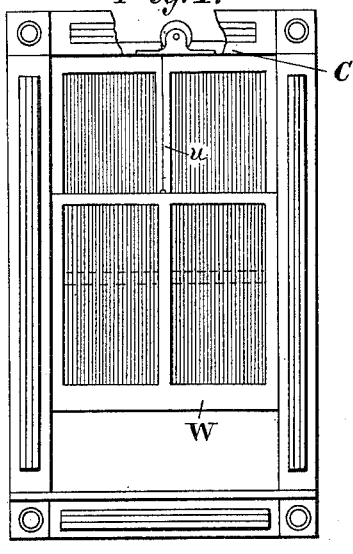
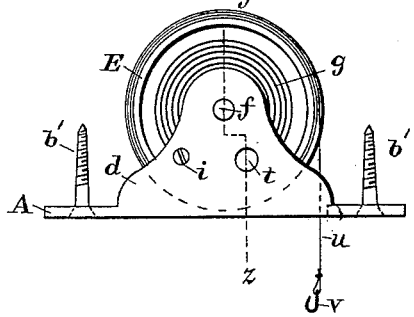
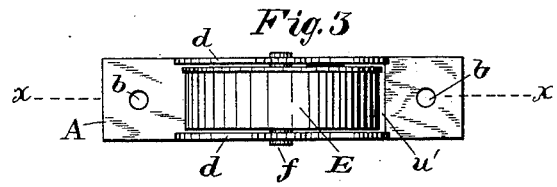
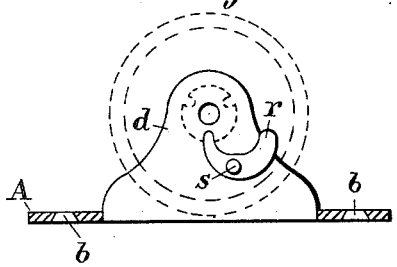
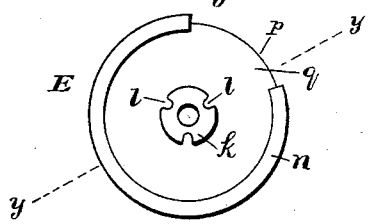
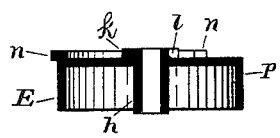
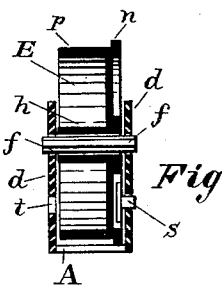
WITNESSES:
A. C. Eader
Jno. E. Morris.
INVENTOR:
G. C. Bolgiano
By Chas B. Mann
Attorney.

United States Patent Office.

GILBERT C. BOLGIANO, OF BALTIMORE, MARYLAND.

SASH-BALANCE.

SPECIFICATION forming part of Letters Patent No. 325,152, dated August 25, 1885.

Application filed May 24, 1884. (No model.)

*To all whom it may concern:*

Be it known that I, GILBERT C. BOLGIANO, a citizen of the United States, residing at Baltimore, in the State of Maryland, have invented certain new and useful Improvements in Sash-Lifters, of which the following is a specification.

My invention relates to a lifter for window-sashes, and will first be described, and then designated in the claim.

In the accompanying drawings, Figure 1 is a view of the window, showing the application of the lifter to the sash. Fig. 2 is a side view of the lifter. Fig. 3 is a top view of same. Fig. 4 is a longitudinal section of the lifter-case, taken on the line $xx$, Fig. 3. Fig. 5 is a view of that side of the drum which adjoins the dog side of the case. Fig. 6 is a diametrical section of the drum on the line $yy$, Fig. 5. Fig. 7 is a vertical cross-section of the lifter on the line $zz$, Fig. 2.

The lifter has a face-plate, A, with holes $b$ at each end for its attachment by screws $b'$ to the top C of the window-frame. At each long edge of the face-plate and integral therewith is a bearing-plate, $d$. Between the two bearing-plates a drum, E, is mounted on a shaft, $f$. One side of the drum is open and forms a chamber, which is occupied by a coiled spring, $g$. The drum-chamber has a central square hub, $h$, on which one end of the coiled spring is secured. The other end of the spring is secured by a screw, $i$, to one of the bearing-plates $d$. The other side of the drum has a central hub, $k$, with three notches, $l$, on its rim. This same side is also provided with a flange, $n$, which projects on the side and also on the face or rim $p$ of the drum, and extends about three-fourths of the way around, leaving a space, $q$, on the side where there is no flange.

A dog, $r$, is pivoted by a pin, $s$, on the inner side of that bearing-plate $d$ which is adjacent to the notched hub. Thus the dog has position between the said bearing-plate and the side of the drum E. The dog is pivoted below the drum shaft. The point or beak end of the dog is light and the other end is heavy. The light end is adapted to engage with the notched hub on the drum, and is held lightly in such engagement by the weight of the other and heavier end. When the point end of the dog is resting in engagement with one of the notches $l$ on the hub of the drum, the latter cannot turn on its shaft, and the result is the sash, hanging, as hereinafter described, by the band $u$ from the drum, will be sustained at whatever position it may have. As the notches are shallow, the dog may readily be released therefrom, so as to lower the sash by first slightly raising the sash with an abrupt movement and then lowering it, or by lowering it with an abrupt movement. The dog is attached, as stated, by a screw or pin, $s$, and this is made fast to its position as follows: First, a hole, $t$, is bored in the other bearing-plate, and then when the dog $r$ and screw or pin $s$ are in position a suitable tool (not shown) is passed through the said hole $t$ and brought against the dog and screw or pin, and the latter is then made fast.

By having the flange $n$ project on the side of the drum where the hub $k$ is located, as before stated, a greater width is obtained of the winding face or rim $p$ without increasing the width of the drum itself. This is of consequence, because the completed article is required to occupy a certain circumscribed space on the window-frame.

The space $q$ on the side of the drum where the flange $n$ is omitted is important, because it serves to allow the drum to be entered to its position between the two bearing plates after the dog has been attached to the latter. In entering the drum the space $q$ takes over or slips past the dog.

A strap or band, $u$, is fastened on the rim $p$ of the drum and wound thereon. It is maintained wound up by the action of the coiled spring $g$. A steel band, cord, or chain may be used. The loose end of the band projects through an opening, $u'$, in the face-plate, and is provided with a hook, $v$, or any other suitable device to connect with the top of the window-sash W, as shown in Fig. 1.

To operate the device a sash thus provided is raised to any desired height and stopped, whereupon the dog $r$ will engage with one of the notches $l$, and thereby hold the sash. When it is desired to lower the sash, it must be seized by the hand and either raised slightly or lowered to release the dog from the notch, and then the sash may be entirely lowered.

I may use the lifter for other purposes than that here shown.

I am aware that spring-actuated drums for lifting sashes are not new, and that pawl-and-ratchet devices have heretofore been employed in connection therewith. I am also aware that spring curtain-rollers have had a gravity-dog, which, however, differs from the one here shown in that said dog pivoted to that part which rotates—to wit, the curtain-roller. These constructions of drums and pivoted dog I do not therefore claim.

Having described my invention, I claim and desire to secure by Letters Patent of the United States—

A lifter for sashes, having in combination a face-plate, A, provided with two bearing-plates, d, a drum, E, having a chamber open at one side, a hub, h, in the chamber, a notched hub, k, on the outside, and having projecting on the same side a flange, n, which extends only part way around, leaving a space, q, where there is no flange, and mounted on a shaft between the said two bearing-plates, a coiled spring, g, having one end secured to the said inner hub, h, and the other end to the bearing-plate adjoining the open side of the chamber, a dog, r, pivoted to the other bearing-plate in position to engage with the notched hub, and a band, u, wound on the drum, as set forth.

In testimony whereof I affix my signature in presence of two witnesses.

GILBERT C. BOLGIANO.

Witnesses:
 GEO. McCAFFRAY,
 JOHN E. MORRIS.